United States Patent Office 3,470,300
Patented Sept. 30, 1969

3,470,300
COMPOSITIONS AND METHODS FOR RELAXING SKELETAL MUSCLES WITH O-SUBSTITUTED BENZOCYCLOBUTENYL KETONE OXIMES
Joseph A. Skorcz, Milwaukee, Wis., assignor to Colgate-Palmolive Company, New York, N.Y., a corporation of Delaware
No Drawing. Continuation-in-part of application Ser. No. 497,498, Oct. 18, 1965. This application Oct. 9, 1967, Ser. No. 673,960
Int. Cl. A61k 27/00; C07c 131/02
U.S. Cl. 424—327                                8 Claims

ABSTRACT OF THE DISCLOSURE

The compounds are O-substituted benzocyclobutenyl ketone oximes useful as skeletal muscle relaxants.

---

The present application is a continuation-in-part of my copending application Ser. No. 497,498, filed Oct. 18, 1965, now abandoned.

BRIEF SUMMARY OF THE INVENTION

The compounds may be represented by the following formula:

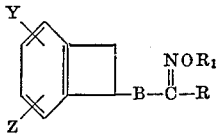

in which Y and Z represent hydrogen, lower alkoxy such as methoxy, ethoxy and propoxy, lower thioalkyl such as thiomethyl and thioethyl, methylenedioxy and trifluoromethyl; R represents a lower alkyl of 1 to 6 carbon atoms such as methyl, ethyl, propyl and hexyl, a cycloalkyl having 3 to 7 carbons in the ring such as cyclopropyl, cyclopentyl and cyclohexyl, a cycloalkyl-lower alkyl in which the cycloalkyl contains 3 to 7 carbon atoms such as cyclohexyl methyl or cyclopentyl ethyl, phenyl, a nuclear substituted phenyl such as p-chlorophenyl, p-methoxyphenyl and dihydroxyphenyl or an aralkyl of 7 to 15 carbon atoms, especially, a phenyl-lower alkyl such as benzyl, phenylisopropyl and phenethyl; B is a single chemical bond or a straight or branched lower alkylene having up to 4 carbons in a chain such as methylene, ethylene, isopropylene and butylene; and $R_1$ is a lower alkyl group of 1 to 6 carbon atoms such as methyl, ethyl, propyl, butyl and isopropyl, a hydroxy-lower alkyl such as hydroxyethyl or hydroxypropyl, a cycloalkyl group having 3 to 7 carbons in the ring such as cyclopropyl, cyclobutyl, cyclopentyl, cyclohexyl and cycloheptyl, a cycloalkyl-lower alkyl group in which the cycloalkyl has 3 to 7 carbons in the ring such as cyclopentylmethyl and cyclohexylethyl, phenyl, a lower alkoxy-substituted phenyl such as p-methoxyphenyl, a halo-substituted phenyl such as o-chlorophenyl, a lower alkenyl of 3 to 6 carbon atoms such as allyl and hexenyl, or an aralkyl of 7 to 15 carbon atoms, especially a phenyl-lower alkyl such as benzyl, phenethyl and phenylisopropyl, and an acyl of the formula

in which $R_2$ is a lower alkyl of 1 to 6 carbon atoms or a phenyl-lower alkyl group.

The novel compounds of the present invention may be advantageously prepared by treating a suitable benzocyclobutene ketone with hydroxylamine to form a benzocyclobutene ketone oxime, forming an anion of the oxime by treating it with a base and reacting the oxime anion with an alkyl halide, acyl halide, aliphatic ester, or an alkylene oxide to form the O-substituted oxime.

This process may be represented as follows:

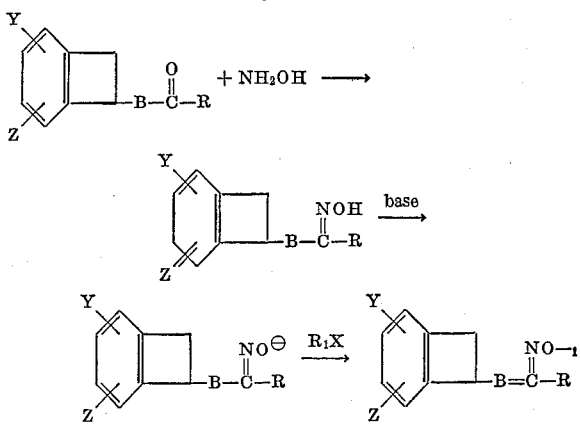

wherein Y, Z, R and $R_1$ have their assigned values and X is a reactive halogen such as bromine or chlorine, a tosylate, or $R_1X$ is an alkylene oxide.

The ketones are converted to the oximes by reaction with hydroxylamine, advisably in an organic reaction medium in which the reactants are soluble. The hydroxylamine can be produced in situ by the neutralization of a hydroxylamine salt such as the hydrochloride. Inorganic bases such as the alkali metal hydroxides, carbonates and bicarbonates, as well as organic bases such as pyridine, can be used to neutralize the acid released from the hydroxylamine salt.

Lower alcohols such as ethanol and isopropanol, as well as other organic solvents in which the reactants are soluble, such as tetrahydrofuran, can be used as the reaction medium. The reaction is promoted by the use of moderately elevated temperatures with the reflux temperature being particularly suitable. The reaction is substantially completed in about 1 to 4 hours. After the reaction is terminated the reaction mixture can be chilled with ice water, extracted with ether and the oily product crystallized from a solvent such as cyclohexane.

The oximes are converted to their oxime anions by treating them with a base such as sodium hydride, sodamide, sodium hydroxide or potassium hydroxide. The oxime anion is then allowed to react with an alkyl halide, acyl halide, aliphatic ester or alkylene oxide to form the O-substituted oximes. The reaction is advisedly carried out in an organic medium such as toluene, dimethylformamide or pyridine under reflux conditions.

Illustrative of some of the O-substituted oximes which can be prepared are:

O-acetyl-1-acetylbenzocyclobutene oxime,
O-phenylacetyl-1-benzocyclobutenyl butyl ketoxime,
O-methyl-1-acetylbenzocyclobutene oxime,
O-methyl-1-benzocyclobutenyl benzyl ketoxime,
O-butyl-1-acetylbenzocyclobutene oxime,
O-benzyl-1-acetylbenzocyclobutene oxime,
O-cyclohexyl-1-benzocyclobutenyl cyclopropyl ketoxime,
O-allyl-1-acetylbenzocyclobutene oxime, and
O-(2-hydroxypropyl)-acetylbenzocyclobutene oxime.

Illustrative of some of the ketones which can be employed in the process are the following:

1-acetylbenzocyclobutene,
1-(7-trifluoromethylbenzocyclobutenyl) ethyl ketone,
1-methyl-1-acetylbenzocyclobutene,
1-benzocyclobutenyl phenyl ketone,
1-benzocyclobutenyl ethyl ketone,
1-benzocyclobutenyl butyl ketone, 1-benzocyclobutenyl benzyl ketone,
1-benzocyclobutenyl cyclopropyl ketone,
1-benzocyclobutenyl cyclohexyl ketone,
1-benzyl-1-acetylbenzocyclobutene, and
1-cyclohexyl-1-benzocyclobutenyl butyl ketone.

These ketones can be produced by reacting a cyano benzocyclobutene with a Grignard reagent to form an acyl or keto benzocyclobutene. This process can be represented as follows:

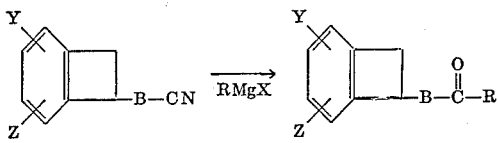

wherein X is a reactive halogen such as chlorine, bromine and iodine; and Y, Z, B and R have the significance previously assigned.

Some of the starting nitriles which can be used in the preparation of the ketones are:

1-cyanobenzocyclobutene,
1-cyanomethylbenzocyclobutene,
1-(2-cyanoethyl)-benzocyclobutene,
1-(1-cyanoethyl)-benzocyclobutene,
1-(3-cyanopropyl)-benzocyclobutene,
1-cyano-3-methyl-benzocyclobutene,
1-cyano-6-trifluoromethyl-benzocyclobutene,
1-cyanomethyl-4,5-methylenedioxy-benzocyclobutene,
1-cyanomethyl-3,4-dimethoxy-benzocyclobutene,
1-cyano-1-methyl-benzocyclobutene,
1-cyanomethyl-1-ethyl-3-methoxy-benzocyclobutene,
1-(3-cyanopropyl)-1-benzyl-6-trifluoromethyl-benzocyclobutene, and
1-cyanomethyl-1-cyclopentylmethyl-benzocyclobutene.

The above described nitriles may be prepared as described in the literature by reacting an appropriately nuclear substituted alpha-halo-ortho-halo toluene with ethyl cyanoacetate to form an ethyl 2-halobenzyl cyanoacetate, hydrolyzing said compound to form 2-halobenzyl cyanoacetic acid, heating said compound in dimethylacetamide to form 3-(2-halophenyl)-propionitrile and cyclizing said compound with sodamide in liquid ammonia to form a 1-cyanobenzocyclobutene having on the phenyl group the same nuclear substituents, Y and Z, as the starting material. Bunnett and Skorcz, J. Org. Chem., vol. 27, page 3836 (1962).

The compounds of the invention possess skeletal muscle relaxant activity as demonstrated by the results obtained in the standard "spinal cat" preparation. In the evaluation the compounds were administered intravenously in doses of 4, 8 and 16 mg./kg. in a total volume of 1 or 2 ml. of propylene glycol to unanesthetized cats with a high spinal transaction at the level of the second cervical vertebrae. The procedure was similar to that employed by Slater et al., J. Pharmacol. Exptl. Therap., vol. 100, page 316 (1950). It involved a determination of relative milligram potency and the degree of selective antagonism of the polysynaptic spinal reflex activity, the flexor reflex, in comparison with the effect on the monosynaptic activity, the patellar reflex or knee jerk. The latter was elicited with an electrically operated automatic hammer and the response of the leg was recorded kymographically from the sectioned Achilles tendon. The flexor response was recorded similarly from the severed end of the anterior tibial tendon of the opposite leg following square wave stimulation of the peripherally litigated ipsilateral tibial nerve. Only one experimental compound was administered to each cat. However, all animals received a final injection of chlorzoxazone, a commercially available skeletal muscle relaxant, as a standard for comparative purposes and to test the viability of the preparation. This was administered at a dose of 8 mg./kg. and occasionally also at a dose of 16 mg./kg. Relative activity is presented in the table as an arbitrary score of 0 to 4+. The table also contains the results obtained in the mouse behavioral profile evaluation which was conducted essentially in accordance with the procedure outlined by S. Irwin in "Animal and Clinical Pharmacologic Techniques in Drug Evaluation," J. H. Nodine and P. E. Siegler, Ed., Year Book Medical Publishers, Inc. 1964, pp. 36–54.

In the table the experimental compounds are numbered the same as the example which describes their preparation, i.e., Compound 3 is the compound of Example 3.

TABLE.—EFFECT ON SPINAL CAT REFLEX AND MOUSE BEHAVIORAL PROFILE

| Compd. | Spinal cat inhibition of— | | Mouse behavioral profile | |
|---|---|---|---|---|
| | Poly-synapse [1] | Mono-synapse [1] | Muscle relaxant activity [2] | Approx. $LD_{50}$, mg./kg. |
| Chlorzoxazone | ++++ | + | +++ | 550 |
| 3 | +++ | 0 | +++ | 550 |
| 4 | +++ | + | ++ | 550 |
| 7 | + | 0 | + | 1320 |
| 8 | +++ | + | + | 550 |

[1] Scoring of relative synaptic reflex inhibition on 0 to 4+ basis.
[2] Scoring of relative muscle relaxant activity on 0 to 3+ basis.

The compounds of this invention may be administered to animals as pure compounds. It is advisable, however, to first combine one or more of the compounds with a suitable pharmaceutical carrier to attain a more satisfactory size to dosage relationship.

Pharmaceutical carriers which are liquid or solid may be used. The preferred liquid carrier is water. Flavoring materials may be included in the solutions as desired.

Solid pharmaceutical carriers such as starch, sugar, talc, and the like, may be used to form powders. The powders may be used as such for direct administration to a patient or, instead, the powders may be added to suitable foods and liquids, including water, to facilitate administration.

The powders may also be used to make tablets, or to fill gelatin capsules. Suitable lubricants like magnesium stearate, binders such as gelatin, and disintegrating agents like sodium carbonate in combination with citric acid may be used to form the tablets.

Unit dosage forms such as tablets and capsules may contain any suitable predetermined amount of one or more of the active agents and may be administered one or more at a time at regular intervals. Such unit dosage forms, however, should generally contain a concentration of 0.1% to 10% by weight of one or more of the active agents. Unit dosage forms should advisably contain about 5 to 150 mg. of the active agents described herein.

A typical tablet may have the composition:

| | Mg. |
|---|---|
| O-methyl-1-acetylbenzocyclobutene oxime | 10 |
| Starch U.S.P. | 57 |
| Lactose U.S.P. | 73 |
| Talc U.S.P. | 9 |
| Stearic acid | 6 |

Powders 1, 2 and 3 are slugged, then granulated, mixed with 4 and 5, and tableted.

Capsules may be prepared by filling No. 3 hard gelatin capsules with the following ingredients, thoroughly mixed:

| | Mg. |
|---|---|
| O-methyl-1-acetylbenzocyclobutene oxime | 5 |
| Lactose U.S.P. | 200 |
| Starch U.S.P. | 16 |
| Talc U.S.P. | 8 |

The oral route is preferred for administering the active agents of this invention. However, other routes of administration, such as parenteral, may be employed.

The following examples are presented to illustrate the invention:

Example 1.—1-acetyl-benzocyclobutene

To the Grignard reagent prepared from 5.8 g. of magnesium and 31.5 g. of methyl iodide was added with refluxing 25.8 g. of 1-cyanobenzocyclobutene in 100 ml. of ether. The mixture was heated for 5 hours and then cooled; the complex was decomposed with saturated ammonium chloride solution. Evaporation of the dried ether solution gave a viscous liquid which was heated in 100 ml. of water at 80° C. for 1 hour. The organic phase was taken up in ether which was dried and evaporated. Distillation of the residue gave the ketone as a colorless liquid, B.P. 93–103° C. at 3.5 mm.

Example 2.—1-acetyl-benzocyclobutene oxime

To a cold solution of 2.4 g. of hydroxylamine hydrochloride and 2.8 g. of sodium acetate in 80 ml. of 50% aqueous ethanol was added dropwise 4.7 g. of the 1-acetylbenzocyclobutene in 15 ml. of ethanol. The solution was stirred in an ice bath for 2 hours, at room temperature for 12 hours and finally was refluxed for 1 hour. Solvent evaporation gave an oil which crystallized on cooling. Recrystallization from n-hexane afforded the oxime as a colorless solid, M.P. 90–91.5° C.

*Analysis.*—Calcd. for $C_{10}H_{11}NO$: C, 74.53; H, 6.88; N, 8.29. Found: C, 74.32; H, 6.82; N, 8.57.

Example 3.—O-acetyl-1-acetylbenzocyclobutene oxime

A cold solution of 1-acetylbenzocyclobutene oxime (6.4 g., 0.04 mole) and triethylamine (4 g., 0.04 mole) in 100 ml. of anhydrous ether is treated dropwise with 3.2 g. (0.04 mole) of acetyl chloride in 50 ml. of ether. The resulting mixture is stirred overnight at 25°. The triethylamine hydrochloride is filtered and washed with ether and the combined ether portions are evaporated to give 8.5 g. of liquid. Distillation of this material provides O-acetyl-1-acetylbenzocyclobutene oxime as a straw-colored liquid, B.P. 114–115° (0.02 mm.).

*Analysis.*—Calcd. for $C_{12}H_{13}NO$: C, 70.92; H, 6.44; N, 6.89. Found: C, 70.95; H, 6.46; N, 6.91.

Example 4.—O-methyl-1-acetylbenzocyclobutene oxime

*Method A.*—A mixture of 1-acetylbenzocyclobutene oxime (7.5 g., 0.046 mole) and 1.9 g. (0.05 mole) of sodium amide in 25 ml. of dimethylformamide is stirred at room temperature for 18 hours, then heated for 1 hour at 50° and cooled. Methyliodide (33 g., 0.23 mole) is added and the mixture stirred for 6 hours at 25°, diluted with ether (300 ml.), and filtered. After a thorough washing with water, the solution is dried and evaporated to afford 7.1 g. of a brown liquid. Elution of this material from 200 g. of alumina with n-hexane-benzene (5:1) gives the O-methyl-1-acetylbenzocyclobutene oxime as a colorless liquid.

*Analysis.*—Calcd. for $C_{11}H_{13}NO$: N, 7.99. Found: N, 7.76.

*Method B.*—A solution of 1-acetylbenzocyclobutene (10 g., 0.07 mole) and 5.7 g. (0.07 mole) of methoxyamine hydrochloride in 60 ml. of pyridine is refluxed for 6 hours. The cooled solution is diluted with water and extracted with chloroform. The chloroform solution is extracted with 2% hydrochloric acid, washed with water, dried, and evaporated to give 6.6 g. of a brown liquid. Elution of this material from 200 g. of alumina with n-hexane-benzene (5:1) gives the O-methyl-1- acetylbenzocyclobutene oxime as a colorless liquid.

*Analysis.*—Calcd. for $C_{11}H_{13}NO$: N, 7.99. Found: N, 7.52.

Example 5.—O-butyl-1-acetylbenzocyclobutene oxime

This compound is prepared from 11 g. (0.075 mole) of the related ketone and 9.4 g. (0.075 mole) of O-butylhydroxylamine hydrochloride in pyridine as described in Example 2, Method B. Elution of the 14.5 g. of the crude product from 350 g. of alumina with n-hexane-benzene (5:1) gives the O-butyl-1- acetylbenzocyclobutene oxime as a pale yellow liquid.

*Analysis.*—Calcd. for $C_{14}H_{19}NO$: C, 77.38; H, 8.81; N, 6.45. Found: C, 77.51; H, 9.03; N, 6.38.

Example 6.—O-benzyl-1-acetylbenzocyclobutene oxime

This compound is prepared from 9.0 g. (0.056 mole) of 1-acetylbenzocyclobutene oxime, 2.4 g. (0.062 mole) of sodamide, and 9.4 g. (0.074 mole) of benzyl chloride in 40 ml. of dimethylformamide essentially as described in Example 2, Method A. The crude O-benzyl-1-acetylbenzocyclobutene oxime (16.5 g.) was eluted from 450 g. of alumina with n-hexanebenzene (4:1) as a yellow liquid.

*Analysis.*—Calcd. for $C_{17}H_{17}NO$: C, 81.24; H, 6.86; N, 5.57. Found: C, 81.56; H, 6.72; N, 5.39.

Example 7.—O-allyl-1-acetylbenzocyclobutene oxime

This compound is synthesized in the usual manner from 9.0 g. (0.056 mole) of oxime I, 2.4 g. (0.062 mole) of sodamide, and 20.4 g. (0.168 mole) of allyl bromide in 40 ml. of dimethylformamide. The crude product (11.6 g.) is eluted from 350 g. of alumina with n-hexane-benzene (3:1) and purified to yield O-allyl-1-acetylbenzocyclobutene oxime, B.P. 76–78° (0.05 mm.).

*Analysis.*—Calcd. for $C_{13}H_{15}NO$: C, 77.58; H, 7.51; N, 6.96. Found: C, 77.71; H, 7.59; N, 6.78.

Example 8.—O-(2-hydroxypropyl) - 1 - acetylbenzocyclobutene oxime

The synthesis is carried out with 2.8 g. (0.016 mole) of 1-acetylbenzocyclobutene oxime, 0.8 (0.02 mole) of sodamide, and 9.0 g. (0.15 mole) of propylene oxide in 25 ml. of dimethylformamide. The crude product (3.2 g.) is eluted from 70 g. of alumina with benzene-ether (1:1). A small portion of the pale yellow oil is purified in a microdistillation apparatus and analyzed.

*Analysis.*—Calcd. for $C_{13}H_{17}NO_2$: C, 71.25; H, 7.81; N, 6.39. Found: C, 71.35; H, 7.97; N, 6.46.

I claim:

1. A pharmaceutical composition selected from tablets and capsules intended for administration to an animal to produce skeletal muscle relaxation comprising 5 to 150 mg. of a compound of the formula

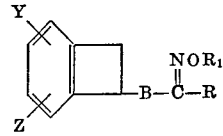

in which Y and Z represent hydrogen, lower alkoxy, lower thioalkyl, methylenedioxy and trifluoromethyl; R represents a lower alkyl of 1 to 6 carbon atoms, a cycloalkyl having 3 to 7 carbons in the ring, a cycloalkyl-lower alkyl in which the cycloalkyl contains 3 to 7 carbon atoms, phenyl, [a chlorophenyl, a methoxyphenyl, a dihydroxyphenyl] or an aralkyl of 7 to 15 carbon atoms; B is a single chemical bond or a straight or branched lower alkylene having up to 4 carbons in a chain; and $R_1$ is a lower alkyl group of 1 to 6 carbon atoms, hydroxy-lower alkyl, a cycloalkyl of 3 to 7 carbon atoms, a cycloalkyl-lower alkyl group in which the cycloalky contains 3 to 7 carbon atoms, phenyl, lower alkenyl of 3 to 6 carbon atoms, an aralkyl of 7 to 15 carbon atoms, or an acyl of the formula

in which $R_2$ is a lower alkyl or phenyl-lower alkyl in combination with a pharmaceutical diluent.

2. A composition of claim 1 in which $R_1$ is acetyl and R is methyl.

3. A composition of claim 1 in which R and $R_1$ are methyl.

4. A composition of claim 1 in which R and $R_1$ are lower alkyl.

5. A composition of claim 1 in which $R_1$ is phenyl-lower alkyl.

6. A composition of claim 1 in which $R_1$ is a lower alkenyl.

7. A composition of claim 1 in which $R_1$ is hydroxy-lower alkyl.

8. The method of relaxing skeletal muscles in an animal which comprises administering to said animal a safe and effective amount of a composition of claim 1 in which in the active compound Y and Z are hydrogen, R is methyl and $R_1$ is selected from methyl, allyl, acetyl and 2-hydroxypropoyl.

References Cited

UNITED STATES PATENTS

| | | | |
|---|---|---|---|
| 3,117,987 | 1/1964 | Horrom | 260—566 |
| 3,149,159 | 9/1964 | Kaiser et al. | 260—566 |
| 3,262,975 | 7/1966 | Paquette | 260—566 |

ALBERT T. MEYERS, Primary Examiner

STANLEY J. FRIEDMAN, Assistant Examiner

U.S. Cl. X.R.

260—506; 424—282

PO-1050
(5/69)

UNITED STATES PATENT OFFICE
CERTIFICATE OF CORRECTION

Patent No. 3,470,300          Dated September 30, 1969

Inventor(s) Joseph A. Skorcz

It is certified that error appears in the above-identified patent and that said Letters Patent are hereby corrected as shown below:

Column 2, line 20, that portion of the formula reading $$B=C-R \text{ with } \overset{NO-}{\|}_1 \quad \text{should read} \quad B-C-R \text{ with } \overset{NOR}{\|}_1$$

Column 6, line 56, that portion in brackets, namely

"[a chlorophenyl, a methoxyphenyl, a dihydroxyphenyl]"

should be deleted.

SIGNED AND
SEALED
FEB 24 1970

(SEAL)
Attest:

Edward M. Fletcher, Jr.
Attesting Officer

WILLIAM E. SCHUYLER, JR.
Commissioner of Patents